UNITED STATES PATENT OFFICE.

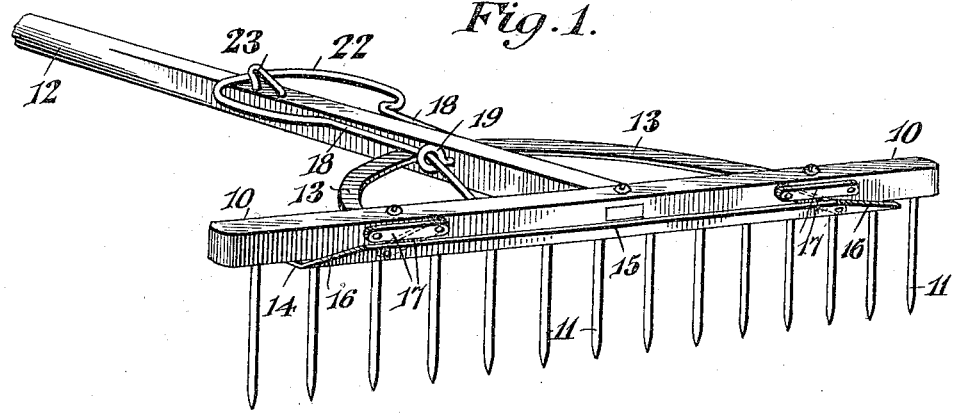
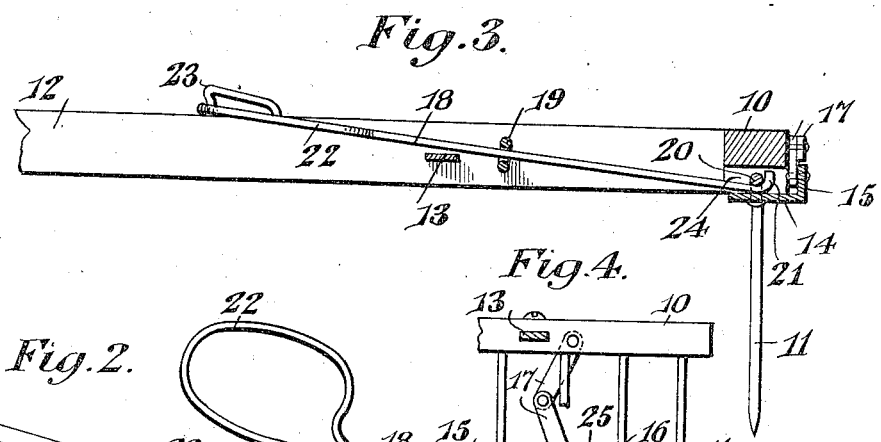
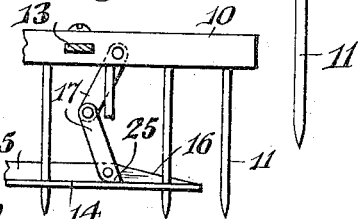
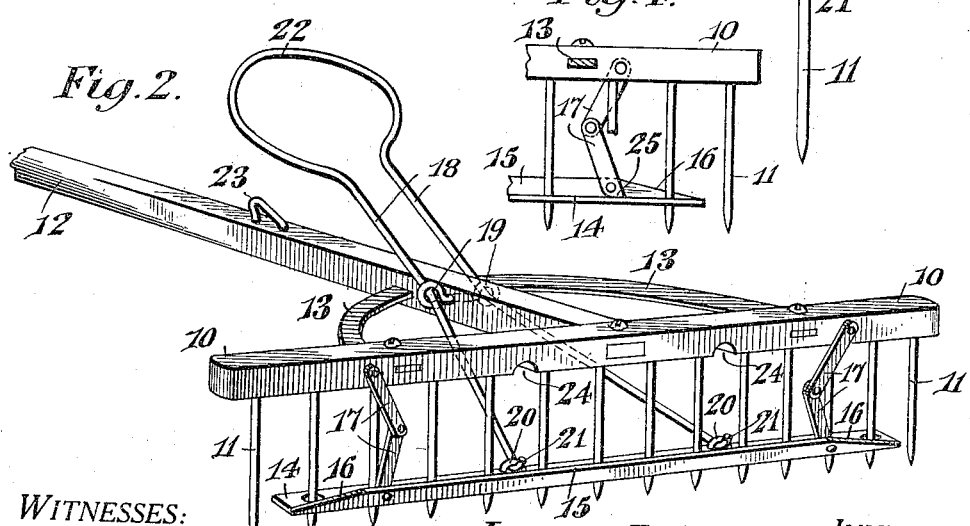

LEWIS J. STILES, OF SHOALS, INDIANA.

RAKE-SHEDDER.

1,181,266.  Specification of Letters Patent.  Patented May 2, 1916.

Application filed November 27, 1915. Serial No. 63,805.

*To all whom it may concern:*

Be it known that I, LEWIS J. STILES, a citizen of the United States, residing at Shoals, in the county of Martin and State of Indiana, have invented a new and useful Rake-Shedder, of which the following is a specification.

The present invention relates to an improved device for attachment to a rake, by means of which leaves, grass, and other material clogging the teeth of the rake, may be quickly removed by shedding the leaves, or other material from the teeth of the rake.

It is an object of this invention to provide a structure, which, when not in use, will not project beyond the rake head or handle, so that the full length of the teeth may be utilized in the employment of the rake, and so that the rake will not be unduly heavy or cumbersome for use, transportation, or when employed in relatively narrow or small places.

It is another object of the invention to provide an attachment, which operates with great ease and quickness, which thoroughly cleans the teeth, and which comprises but relatively few parts of simple formation and arrangement, wherein no springs, or the like, are depended upon for the operation and locking of the parts together, and which provides for an extremely compact, light, and easily operated structure.

The above and other objects and advantages of this invention will be more clearly brought out in the following detail description of the present preferred embodiment of the invention, the same being illustrated in the accompanying drawing, wherein:—

Figure 1 is a perspective view of a rake having the attachment applied thereto, and in closed or collapsed position. Fig. 2 is a similar view showing the device open or extended. Fig. 3 is a longitudinal section, taken through the rake, and the attachment, showing the mounting of the attachment on the rake head and the handle. Fig. 4 is a detail fragmentary view, showing in elevation, the inner side and one end of the rake head and teeth, the adjacent end of the shedder bar being disclosed with its connection to the rake head.

Referring to this drawing, 10 designates a rake head, 11 designates a plurality of spaced apart teeth depending from the rake head, and 12 designates the ordinary rake handle, which is secured to the rake head 10 at an intermediate portion thereof, and which projects backwardly and upwardly from the same. The handle 12 is braced upon the head 10 by a brace bar 13, which is secured in any suitable manner at its opposite ends to the rake head 10, near the ends of the latter, and which passes, at its intermediate portion, through the handle 12, at a point spaced from the rake head 10.

The attachment of this invention for application to the rake to shed leaves, and other obstructing matter from and between the teeth 11, comprises a shedder bar 14, which, in the present instance is disclosed as in the form of a flat perforated bar, through which the teeth 11 pass, the bar 14 having at its forward edge an upstanding flange 15, adapted, when the device is closed or collapsed, to lie close to the front of the head 10. The shedder bar 14 extends throughout substantially the length of the rake head 10, and the ends of the upstanding flange 15 are preferably beveled off, as at 16 to offset any abrupt corners, or shoulders, and to also ward off leaves and the like, which might possibly catch in the ends of the shedder bar. This shedder bar is held in place on the teeth 11, and at the same time is permitted of its free movement longitudinally of the teeth 11, by pairs of hinged links 17. Each pair of links 17 comprises two relatively flat short bars hinged together at their inner ends, and which are hinged at their opposite outer ends respectively to the head 10, and to the flange 15 of the shedder bar. It will be noted, particularly from Fig. 3, that the links 17 are hinged against the inner side of the flange 15, and that when the attachment is collapsed, the lower portions of the hinged links lie between the flange 15, and the head 10 to thus close in the lower portions of the links and present a smooth uninterrupted lower side and front edge to the rake head 10. With this construction, it is readily seen that there are no exposed projections, or the like, upon and between which leaves and other foreign matter, may accumulate, during the use of the rake. The shedder bar 14 is thus mounted to loosely slide up and down on the teeth 11, no springs or other automatic devices being used for holding the shedder bar in either raised or lowered position. The means for operating the shedder bar is a positive means in the form of a hand lever 18. The hand lever 18, as may be best seen from Fig. 2, is substantially U-shape, having its opposite arms extending along the opposite sides of the handle 12, and slidably and pivotally engaged in eyes 19, projecting from the opposite sides of the handle 12 a short distance from the rake head 10. The forward extremities of the lever arms diverge slightly and are hingedly connected to the upper side of the shedder bar 14, by staples 20, or the like, which are riveted or otherwise suitably secured in the shedder bar, and which project upwardly about the extremities of the lever 18, to hold the same to the bar.

It will be noted that the extremities of the lever 18 are rounded or curved upwardly to provide hooks 21 adapted to retain the lever 18 upon the staples 20, and at the same time to provide for a means for rocking or hinging the lever 18 upon the staples 20. The inner or rear end of the lever 18 is looped, as at 22, to provide for an easy hand hold or grip by means of which the lever 18 may be swung up and down from the position shown in Fig. 1 to the position shown in Fig. 2. The hand lever 18 is preferably formed of very heavy wire which naturally has a slight spring action. The present invention takes advantage of this spring action in providing the rake handle 12, with a nose or shoulder 23, located in the path of the upper end or loop of the lever 18, so that when the lever is closed or swung down into the position shown in Fig. 1, the loop 22 may be sprung over the nose or shoulder 23, and the device locked or secured in closed position, as shown in Figs. 1 and 3.

In the use of the rake with this improved attachment applied thereto, when the teeth 11 become clogged with leaves, grass, dirt, and the like, it is only necessary for the operator to place the thumb on the nose 23, and grasp the loop 22 in the fingers of the same hand, and press the loop upwardly to thus spring the same from beneath the nose. As soon as the lever 18 is thus released or unlocked, the loop 22 may be forced upwardly into the position shown in Fig. 2, the hand lever 18, during such upward swinging movement, turning upon the eyes 19, and at the same time sliding forwardly through the eyes so as to take up the radial difference in the lengths of the power arm of the lever 18, when in its raised and when in its lowered positions. Thus, this peculiar mounting of the hand lever admits of this free raising and lowering of the shedder bar, so that considerable pressure may be exerted upon the handle 22, without straining any of the parts of the rake, or this attachment, and the pressure will be exerted directly upon the shedder bar 14 to eject or strip the leaves, grass, and the like, from the teeth, and from the throats or space between the teeth. After the teeth have been cleaned, it is only necessary to swing the lever 18 back into its original position, and press the loop 22 over the nose 23. It will thus be seen that when the device is closed or collapsed, the shedder bar 14 lies close up beneath the rake head 10, recesses or pockets 24 being provided in the under side of the rake head 10, for the reception of the staples 20 and the hooks 21 of the hinged connection between the lever and the shedder bar.

It will also be noted, as has been above set forth, that the upstanding flange 15 wards off accumulations of grass, dirt, and the like, from the connecting links 17, and from clogging up the pockets or recesses 24 in the under side of the head 10.

The device as a whole occupies but relatively small space, avoids projections of any appreciable nature in any direction, and lies flat against the various parts of the rake, so that the attachment is entirely out of the way, when not in use, but at the same time is in such position that it may be immmediately brought into use.

From Fig. 4, it will be noted that the lower one of each pair of links 17 has at its lower end, and at its outer edge, a projection or shoulder 25 constituting a stop to limit the opening of the links 17, when the shedder bar is lowered. This stop 25 engages the upper surface of the shedder bar 14 and limits the upward swinging of the lower link, and thus prevents the straightening and locking of the links from collapsing, as well as preventing the links from buckling outwardly or in the wrong direction.

It is within the spirit of this invention to modify the construction of the device as above specifically described and shown in detail in the accompanying drawings, within the scope of the following claims.

What is claimed is:—

1. The combination with a rake head, teeth depending from the head, and a handle attached to and extending rearwardly from the head, of a shedder bar having openings therein to receive said teeth, foldable links between said head and the shedder bar to retain the bar in position, and adapted to lie close to the head when the shedder bar is raised, and a hand lever pivoted on said handle and having hinged connection at its forward end to the shedder bar.

2. The combination with a rake head, having depending teeth, and a handle carried by the rake head, and extending rearwardly therefrom, of a shedder bar slidable on the teeth, links between the head and the shedder bar to hold the latter in place, and a hand lever pivotally and slidably mounted on the handle and having a hinged connection with the shedder bar to move the same over the teeth upon the swinging and sliding of the hand lever.

3. The combination with a rake head, having depending teeth thereon, and a handle projecting rearwardly from the rake head, of a shedder bar slidable on the teeth, links connecting the shedder bar to the head to hold the bar in place, a hand lever mounted to swing freely upon said handle, and having hinged connection at its forward end to the shedder bar to raise and lower the same upon the swinging of the hand lever, and securing means upon the handle for engagement with the hand lever when the same is swung against the handle in closed position.

4. The combination with a rake head having depending teeth, and a handle carried by the rake head, of a shedder bar movable longitudinally upon the teeth, links connecting the shedder bar to the head and admitting of the free movement of the shedder bar, a pair of eyes in the opposite sides of the handle in spaced relation to the head, a U-shape hand lever having its opposite arms engaging through said eyes to pivotally and slidably support the hand lever, hooks upon the outer ends of the hand lever, staples carried upon the shedder bar for engagement with the hooks to hingedly connect the hand lever to the shedder bar, and a nose carried upon the handle for engagement with the inner end of the hand lever when the same is swung down and drawn inwardly to collapse the attachment.

5. The combination with a rake head, having depending teeth, and a handle extending rearwardly from the rake head, of a shedder bar slidably mounted on the teeth, links connecting the shedder bar to the head and admitting the free movement of the shedder bar on the teeth, a hand lever pivotally and slidably mounted for free movement upon the handle to raise and lower the shedder bar on the teeth, and a resilient holding means on the handle for engagement with the lever, when the shedder bar is raised.

6. The combination with a rake head having depending teeth, and a handle extending rearwardly from the rake head, of a shedder bar of substantially right angular cross section, having a horizontal flange slidable on the teeth, and having an upstanding flange adapted to lie against the outer face of said head, links hinged at one end to the head, and at their opposite ends against the inner side of said upstanding flange, and adapted to be housed thereby, when the shedder bar is raised, a lever carried by the handle, hooks on the outer end of the lever, staples secured in the horizontal flange of the shedder bar, and engaging said hooks to hingedly connect the lever to the shedder bar, said head having recesses in its under side adapted to receive said hooks and said staples when the shedder bar is raised, and a nose carried upon said handle over which said hand lever is adapted to be swung to retain the shedder bar in collapsed position.

7. The combination with a rake head having depending teeth, and a handle carried by the rake head, of a shedder bar slidable on the teeth, links hinged to said rake head and to said shedder bar, the lower ends of the links having stops thereon for engagement against the upper face of the shedder bar to limit the spreading of the links and prevent locking of the same from collapsing, and a hand lever mounted on said rake handle and having connection with the shedder bar to move the same over the teeth upon the swinging of the hand lever.

In testimony, that I claim the foregoing as my own, I have hereto affixed my signature in the presence of two witnesses.

LEWIS J. STILES.

Witnesses:
WILLIS C. LANDIS,
JOHN M. SHEPARD.

Copies of this patent may be obtained for five cents each, by addressing the "Commissioner of Patents, Washington, D. C."